US012083520B2

(12) United States Patent
Lin et al.

(10) Patent No.: US 12,083,520 B2

(45) Date of Patent: Sep. 10, 2024

(54) INTEGRATED REAGENT CARTRIDGE

(71) Applicant: EGI Tech (Qing Dao) Co., Limited, Shandong (CN)

(72) Inventors: Sz-Chin Lin, San Jose, CA (US); Sixing Li, Mountain View, CA (US); Yiwen Ouyang, San Jose, CA (US)

(73) Assignee: EGI Tech (Qing Dao) Co., Limited, Shandong (CN)

( * ) Notice: Subject to any disclaimer, the term of this patent is extended or adjusted under 35 U.S.C. 154(b) by 216 days.

(21) Appl. No.: 17/584,631

(22) Filed: Jan. 26, 2022

(65) Prior Publication Data

US 2022/0250079 A1 Aug. 11, 2022

Related U.S. Application Data

(60) Provisional application No. 63/146,290, filed on Feb. 5, 2021.

(51) Int. Cl.
*B01L 3/00* (2006.01)

(52) U.S. Cl.
CPC ......... *B01L 3/527* (2013.01); *B01L 2200/027* (2013.01); *B01L 2200/0684* (2013.01); *B01L 2200/0689* (2013.01); *B01L 2200/16* (2013.01); *B01L 2300/123* (2013.01); *B01L 2300/1894* (2013.01)

(58) Field of Classification Search
CPC ............... B01L 3/527; B01L 2200/027; B01L 2200/0684; B01L 2200/0689; B01L 2200/16; B01L 2300/123; B01L 2300/1894
See application file for complete search history.

(56) References Cited

U.S. PATENT DOCUMENTS 5,147,780 A 9/1992 Pouletty et al.
2003/0153021 A1 8/2003 Lu et al.
2009/0246085 A1* 10/2009 Watson ................. B01L 3/0293 422/400
2009/0249949 A1* 10/2009 Kepler ............... B01D 19/0036 95/44
2009/0269246 A1* 10/2009 Hasegawa ............ B65D 51/222 422/400

(Continued)

FOREIGN PATENT DOCUMENTS

WO 9840466 A1 9/1998
WO 2010043044 A1 4/2010

(Continued)

OTHER PUBLICATIONS

International Application No. PCT/CN2022/074872, International Search Report and the Written Opinion mailed on Apr. 28, 2022, 11 pages.

(Continued)

*Primary Examiner* — Matthew D Krcha
*Assistant Examiner* — Sophia Y Lyle
(74) *Attorney, Agent, or Firm* — Kilpatrick Townsend & Stockton LLP

(57) ABSTRACT

An integrated reagent cartridge can be configured to hold and deliver reagents during sequencing. The integrated reagent cartridge can include a large-volume reagent region, a small-volume reagent region, a top cover, a bottom shell assembly, and a manifold assembly.

21 Claims, 14 Drawing Sheets

(56) References Cited

U.S. PATENT DOCUMENTS

| | | | | |
|---|---|---|---|---|
| 2011/0004187 | A1* | 1/2011 | Beiriger | A61M 5/162 604/500 |
| 2013/0130262 | A1 | 5/2013 | Battrell et al. | |
| 2015/0140681 | A1 | 5/2015 | Meng et al. | |
| 2016/0184826 | A1* | 6/2016 | Nemoto | B01L 3/52 436/66 |
| 2019/0376993 | A1* | 12/2019 | Accurso | G01N 35/1079 |
| 2020/0115666 | A1* | 4/2020 | Goral | C12M 99/00 |
| 2020/0171502 | A1* | 6/2020 | Kumar | F28D 1/024 |

FOREIGN PATENT DOCUMENTS

| | | | |
|---|---|---|---|
| WO | 2015073999 | A1 | 5/2015 |
| WO | 2020008463 | A2 | 1/2020 |

OTHER PUBLICATIONS

International Application No. PCT/CN2022/074872, International Preliminary Report on Patentability mailed on Aug. 17, 2023, 6 pages.

* cited by examiner

INTEGRATED REAGENT CARTRIDGE

CROSS-REFERENCE TO RELATED APPLICATIONS

This application claims the benefit of U.S. Provisional Application No. 63/146,290, filed Feb. 5, 2021 for an "Integrated Reagent Cartridge," the entire contents of which are herein incorporated by this reference.

RELATED FIELDS

Integrated reagent cartridges, and fluidics systems and methods using those reagent cartridges, such as for nucleic acid sequencing.

BACKGROUND

As nucleic acid sequencing technologies have advanced, there has been an effort in reducing the complexity and cost of sequencers. Many of these technologies utilize microfluidics, which deals with the behavior, precise control, and manipulation of fluids that may be geometrically constrained to a small, typically sub-millimeter, scale at which capillary penetration governs mass transport.

Sequencing is the process of determining the nucleic acid sequence, or the order of nucleotides, such as in DNA. DNA sequencing includes methods or technologies that are used to determine the order of the four base nucleotides: adenine, guanine, cytosine, and thymine. Knowledge of DNA sequences has become indispensable for basic biological research, and in numerous applied fields such as medical diagnosis, biotechnology, forensic biology, virology and biological systematics. Comparing healthy and mutated DNA sequences can diagnose different diseases including various cancers, characterize antibody repertoire, and can be used to guide patient treatment. Having a quick way to sequence DNA allows for faster and more individualized medical care to be administered, and for more organisms to be identified and cataloged.

BRIEF SUMMARY

In this patent, we describe integrated reagent cartridges, and systems and methods for DNA and other nucleic acid sequencing utilizing those cartridges. While the examples provided below are in the context of an integrated reagent cartridge for sequencing systems and methods, it should be appreciated that these cartridges can also be beneficially used in other fluidics-based systems and methods.

Conventional sequencing and other fluidics-based systems typically encounter a number of challenges. For example, many conventional sequencing systems are not portable and, due to their size, are expensive. Embodiments disclosed herein include reagent cartridges that can allow easy configuration of the sequencing system. Additionally, the reagent cartridges can be stored separately from other components of the sequencing system. When an end-user requires the reagents, the reagent cartridge and other components may be engaged with each other to deliver the reagents and sequence DNA or other nucleic acid samples on demand.

Embodiments disclosed herein may offer a number of advantages over more conventional solutions. For example, the reagent cartridge can provide proper sequencing reagent storage for off-board conditions (e.g., light prevention, frozen, air tight) and on-board conditions (e.g., light prevention, suitable temperature, oxygen permeation, light prevention), to ensure optimal chemical reactivity of the reagents, along with proper sequencing reagent handling that prevents run-to-run contamination. As another example, the reagent cartridge may be configured to reliably align, seal, and interface its fluid ports with the corresponding fluid ports of a sequencing chip. Additionally, the reagent cartridge is configured to interface with an instrument that provides a driving force for piercing and sealing components of the reagent cartridge. As a result, all the reagents are dispensable and properly provided for the sequencing reaction during the sequencing reactions. As another example, the reagent cartridge allows different sealed reagent compartments to be accessed and vented depending on the sequencing reaction. As another example, the reagent cartridge provides an interface with an external pump (e.g., on instrument or disposable) which drives reagent delivery. Additionally, the reagent cartridge provides reagent leakage prevention without emptying out large-volume reagent reservoirs if the reagent cartridge is disengaged from the sequencing system.

In one example, an integrated reagent cartridge includes: (a) a shell including a plurality of fluidic device ports configured to connect to a fluidic device; (b) a plurality of reagent storage containers inside the shell, at least some of the reagent storage containers each containing a fluid reagent; (c) in which at least some of the reagent storage containers are positioned inside the shell in a movable fashion such that those reagent storage containers can be moved inside the shell from positions in which those containers are not fluidically connected to the plurality of fluidic device ports to positions in which those containers are fluidically connected to the plurality of fluidic device ports.

In some instances, some of the reagent storage containers include reagent reservoirs, wherein the reagent reservoirs each have a seal and at least one reservoir port.

In some instances, the integrated reagent cartridge is configured for the reagent reservoirs to be vented and fluidically connected to the fluidic device ports such that in a first position the reagent reservoirs are each sealed and in a second position the reagent reservoirs are each vented and connected by at least one of the reservoir ports to one of the fluidic device ports.

In some instances, some of the reagent storage containers include flexible reagent storage containers, in which the flexible reagent storage containers each include at least one port.

In some instances, the flexible reagent storage containers each include at least one filling port configured to receive reagent and at least one dispensing port configured to be connected to one of the fluidic device ports.

In some instances, the integrated reagent cartridge is configured for the flexible reagent storage containers to be fluidically connected to the fluidic device ports such that in a first position the flexible reagent storage containers are each disconnected from the fluidic device ports and in a second position the flexible reagent storage containers are each connected by at least one of the dispensing ports to one of the fluidic device ports.

In some instances, the filling port of some of the flexible reagent storage containers includes a self-sealing plug, in which the filling port of other of the flexible reagent storage containers includes an open filling port for user input of reagent.

In some instances, the shell includes at least one opening aligned with at least one of the open filling ports.

In some instances, the integrated reagent cartridge further includes frangible supports configured to resist movement of the reagent storage containers inside of the shell.

In some instances, the integrated reagent cartridge further includes several port piercers, each port piercer fluidically connected to one of the fluidic device ports, the port piercers configured to pierce sealed ports of the reagent storage containers when the reagent storage containers are moved to the positions in which those containers are fluidically connected to the plurality of fluidic device ports.

In some instances, the integrated reagent cartridge further includes several venting piercers, each venting piercer configured to be moved to vent one or more of the reagent storage containers.

In some instances, some of the venting piercers are movable portions of the shell.

In some instances, some of the venting piercers are movable structures inside of the shell.

In some instances, the integrated reagent cartridge further includes several alignment structures configured to align the integrated reagent cartridge relative to the fluidic device.

In some instances, the integrated reagent cartridge further includes several fluid channels, each configured for fluidic connection between one of the reagent storage containers and one of the fluidic device ports.

In some instances, the fluid channels include gas permeable fluid channels.

In some instances, the fluid channels are configured to resist reagent leaking when the integrated reagent cartridge is disconnected from the fluidic device.

In some instances, the fluid channels each include a top position that, when the integrated reagent cartridge is in an upright orientation, is higher than a maximum fluid surface level of the reagent storage container to which the fluid channel is fluidically connected.

In some instances, the shell includes at least one cooling air inlet and outlet.

In some instances, the integrated reagent cartridge further includes a manifold extending through the integrated reagent cartridge, the manifold having at least one microfluidic channel.

In some instances, the manifold further includes at least one port at a first end of the microfluidic channel configured to fluidically connect to a pump port of an instrument, and at least one port at a second end of the microfluidic channel configured to connect to an exit port of the fluidic device.

In another example, an integrated reagent cartridge includes: (a) several reagent storage containers, some of the reagent storage containers including reagent reservoirs, in which at least some of the reagent reservoirs each includes a ventable seal and at least one reservoir port; (b) several fluidic device ports configured to fluidically connect to the reagent reservoirs to a fluidic device; and (c) several frangible supports, the frangible supports configured to support the reagent reservoirs in a first position in which the ventable seals can be pierced, the plurality of frangible supports configured to break to allow the reagent reservoirs to move to a second position in which the reagent reservoirs are fluidically connected to the fluidic device ports.

In some instances, the integrated reagent cartridge further includes movable venting piercers configured to pierce the ventable seals.

In some instances, the integrated reagent cartridge further includes piercing ports fluidically connected to the fluidic device ports, the piercing ports configured to pierce and fluidically connect to the reservoir ports when the reagent reservoirs move to the second position.

This summary is provided to introduce the different embodiments of the present disclosure in a simplified form that are further described in detail below. This summary is not intended to be used to limit the scope of the claimed subject matter. Other features, details, utilities, and advantages of the claimed subject matter will be apparent from the following detailed description.

BRIEF DESCRIPTION OF THE DRAWINGS

It will be appreciated that for simplicity and clarity of illustration, elements shown in the Figures have not necessarily been drawn to scale. For example, the dimensions of some of the elements are exaggerated relative to each other for clarity. Further, where considered appropriate, reference numerals have been repeated among the Figures to indicate corresponding elements.

DETAILED DESCRIPTION

In the following detailed description, reference is made to the accompanying drawings which form a part hereof, and in which is shown by way of illustration specific embodiments in which the invention may be implemented. The terms "height," "top," "bottom," etc., are used with reference to the orientation of the figures being described. Because components of embodiments of the present invention can be positioned in a number of different orientations, the term is used for purposes of illustration and is not limiting.

Figure 1B:
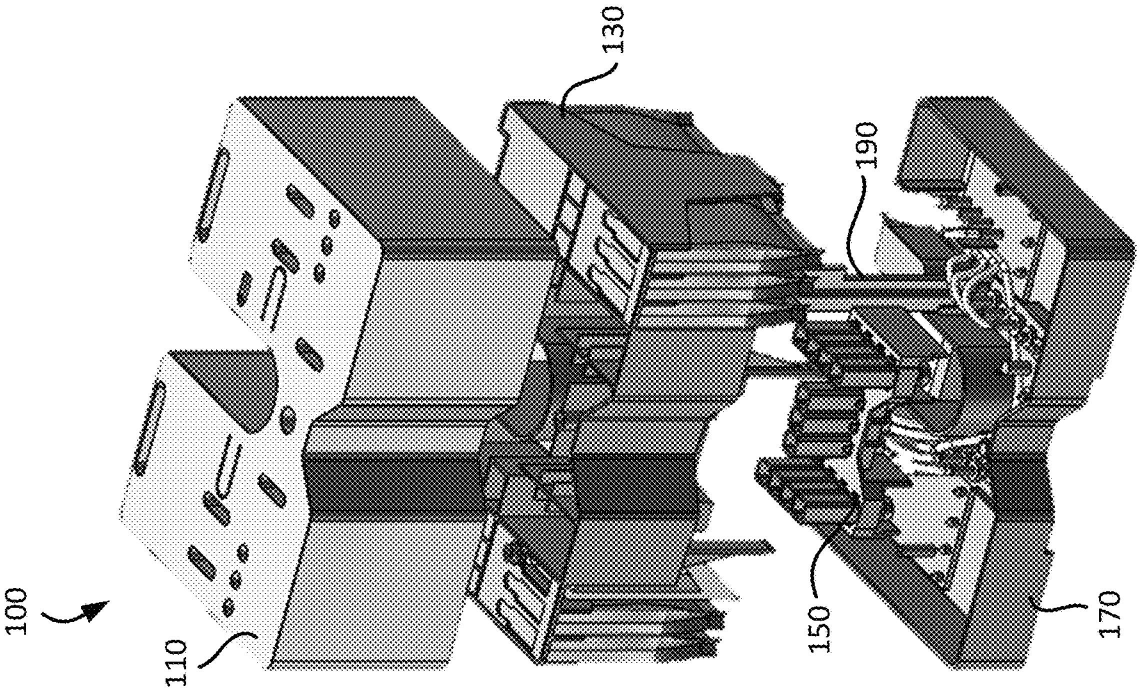
FIGS. 1-1B illustrates an example of an integrated reagent cartridge of a sequencing system.
Figure 1A:
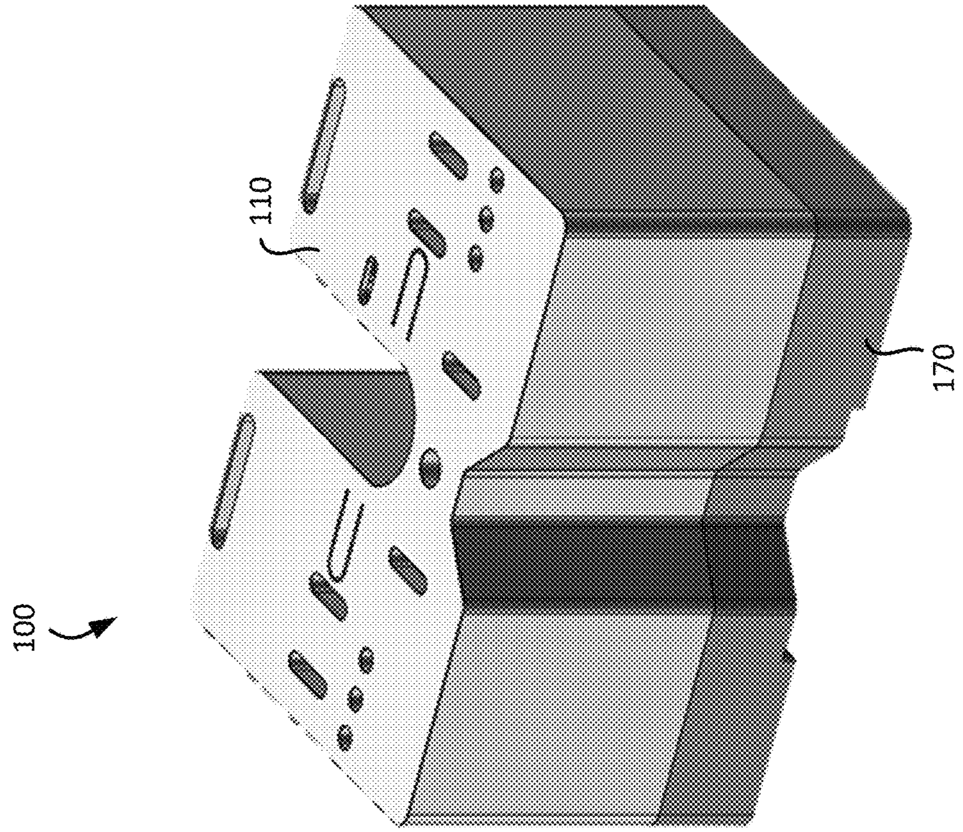

FIGS. 1A-1B illustrates an example of an integrated reagent cartridge (IRC) 100 of a sequencing system. In this example, the IRC includes a top cover 110, a bottom shell assembly 170, a large-volume reagent region 130, a small-volume reagent region 150, and a manifold assembly 190. When connected, the top cover 110 and the bottom shell assembly 170 form a shell that the remaining components are positioned within. Each of these components is discussed in further detail below.

The IRC 100 may include one or more reagent storage containers within the shell. For example, the one or more reagent storage containers can include large reagent reservoirs, the small-volume reagent reservoirs, and flexible reagent storage containers, such as reagent bags. Different integrated reagent cartridges can include different numbers and combinations of these or other types of reagent storage containers.

FIGS. 2A-2D shows the large-volume reagent region 230 of the integrated reagent cartridge of FIGS. 1A-B in more detail. The large-volume reagent region 230 can store between three and twelve different sequencing-related reagents. The volume of each of the sequencing-related reagents can range from two to two-hundred milliliters, with a total volume up to six-hundred milliliters for the large-volume reagent region 230.

Figure 2A:
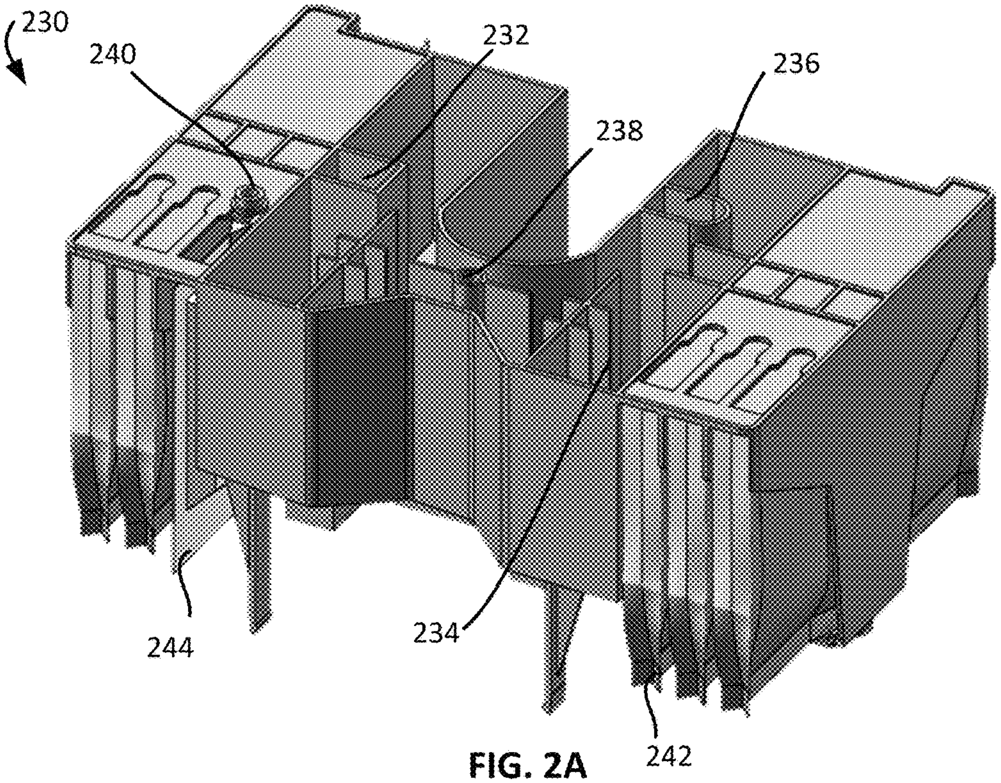
FIGS. 2A-2D illustrate an example of a large-volume reagent region of an integrated reagent cartridge.
Figure 2B:
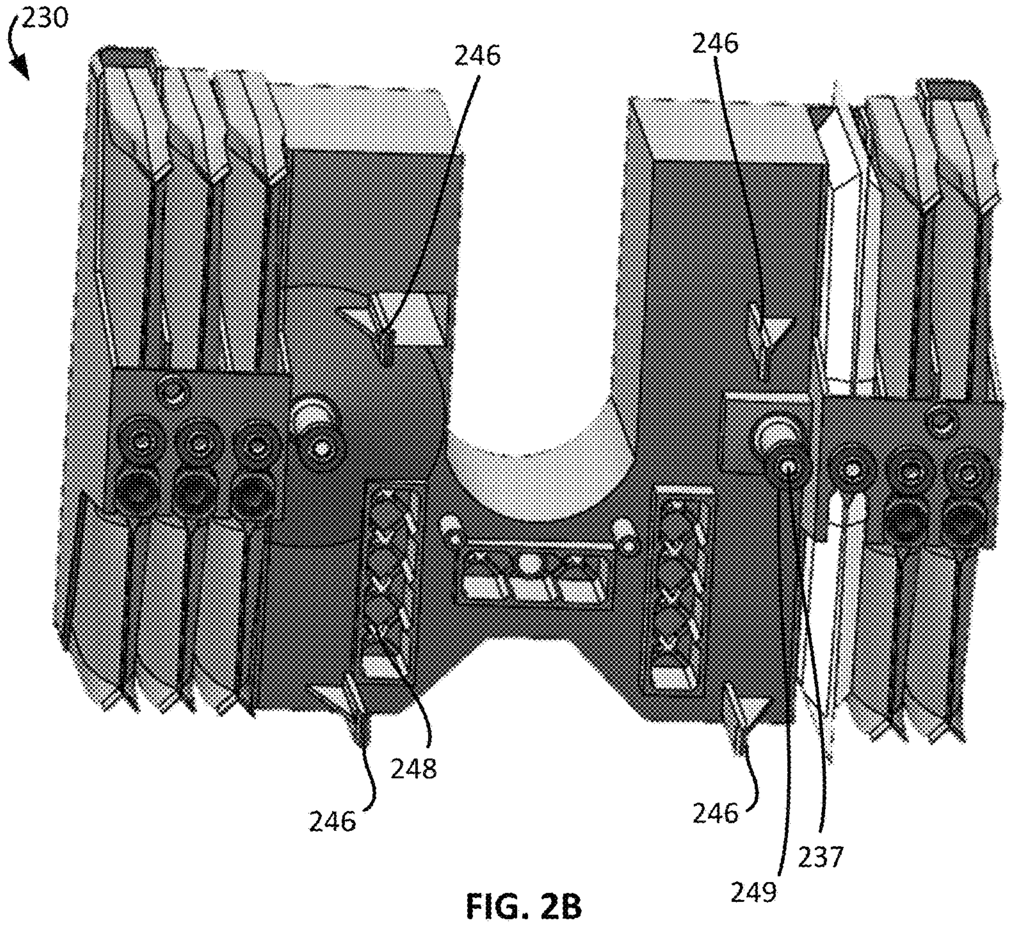

Referring to FIG. 2A, the large-volume reagent region 230 can include a first large reservoir 232 and a second large reservoir 234. Each of the first large reservoir 232 and the second large reservoir 234 can store reagents. A top surface of the large-volume reagent region 230 may be heat-sealed, such as with aluminum foil, after the first large reservoir 232 and the second large reservoir 234 have been filled. Additionally, the large-volume reagent region 230 also includes reagent bags for storing additional reagents. In FIGS. 2A-2B there are six reagent bags, five of which are a first type of reagent bag 242 and one of which is a second type of reagent bag 244. Other examples may include a different number or combination of the first type of reagent bag 242 and the second type of reagent bag 244. The first and second types of reagent bags are further described below in connection with FIGS. 2C and 2D, respectively.

As shown in FIG. 2A, the large-volume reagent region 230 includes ports for a user to manually input a reagent before a sequencing reaction. A first port 240 can be for freshly prepared large-volume enzyme reagents. A second port 238 can be for freshly prepared small-volume enzyme reagents. The large-volume reagent region 230 can additionally include a manifold slot 236 for housing a manifold assembly (e.g., manifold assembly 190), which is discussed further below.

Referring to FIG. 2B, the large-volume reagent region 230 as shown includes resilient connectors 246 for coupling the large-volume reagent region 230 to a sequencing chip. Venting piercers 248 on the underside of the large-volume reagent region 230 are positioned and configured for venting reagent reservoirs of a small-volume reagent region (e.g., small-volume reagent region 150), which is also discussed further below. In addition, the large-volume reagent region 230 can include one or more ports 237 for each large reservoir 232/234 and reagent bag 242/244 that are positioned and otherwise configured for connection to the sequencing chip. Each port 237 has a gasket ring 249 for sealing the large-volume reagent region 230 and the sequencing chip.

Figure 2C:
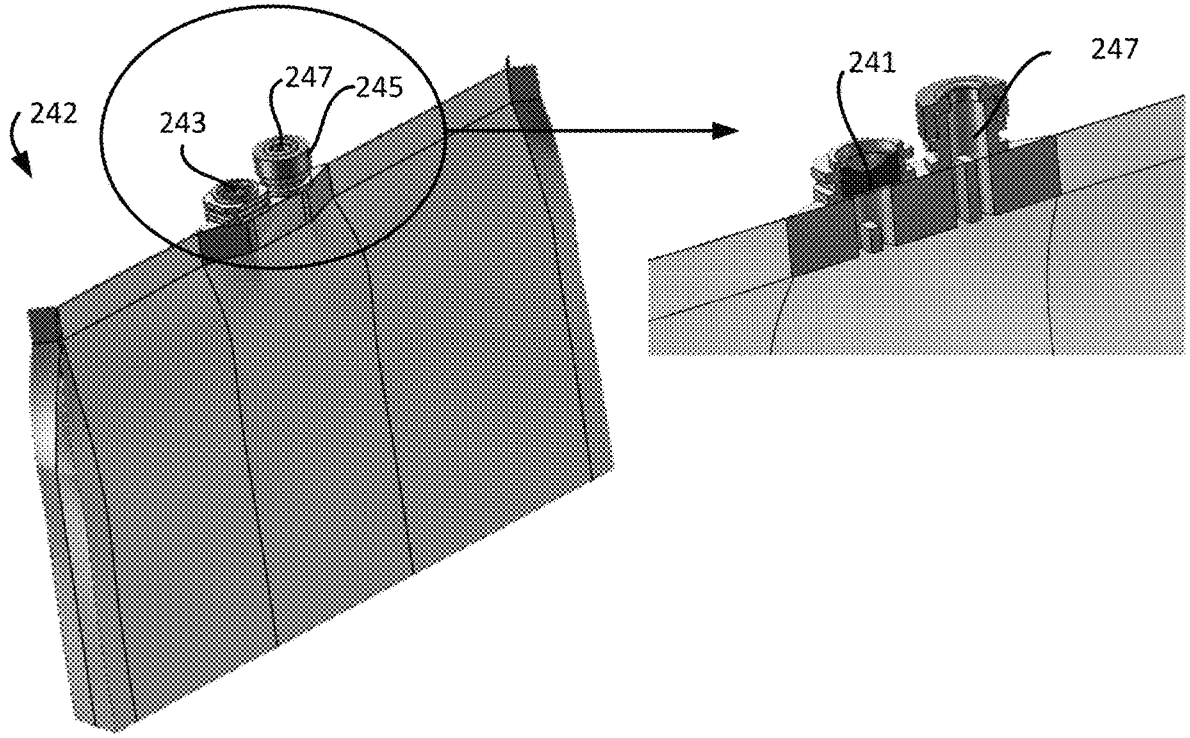

FIG. 2C illustrates an example of the first type of reagent bag 242. The body of the reagent bag 242 can be made from light-proof, gas-impermeable aluminum foil to protect light or oxygen sensitive reagents. Additionally, the first type of reagent bag 242 can include a reagent-filling port 243 and a gasket ring 245 over a pierceable port 247. The reagent-filling port 243 and the pierceable port 247 can be sealed with aluminum foil. Additionally, the reagent-filling port 243 can include a self-sealing plug 241 to protect the reagent from light and oxygen during filling, storage, and sequencing.

Figure 2D:
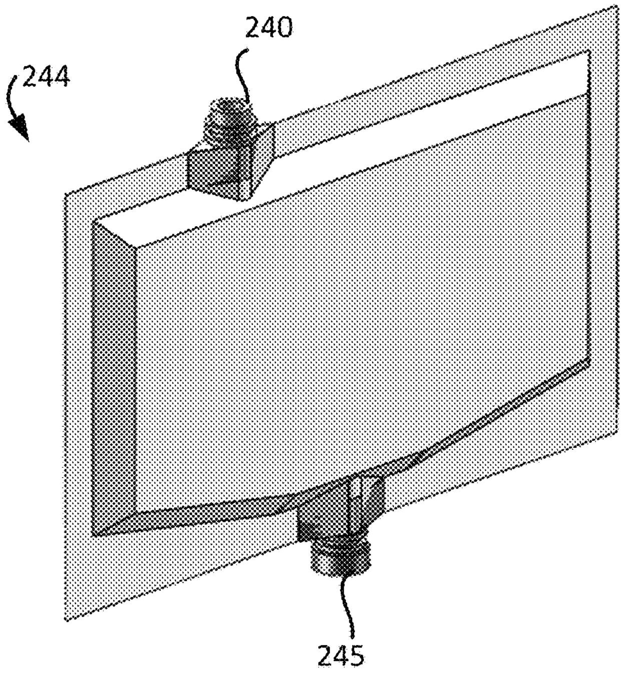

FIG. 2D illustrates an example of the second type of reagent bag 244. The second type of reagent bag 244 can include the first port 240 for receiving freshly prepared enzyme reagents. Additionally, the second type of reagent bag 244 can include the gasket ring 245 over a pierceable port with an aluminum foil heat seal.

Figure 3A:
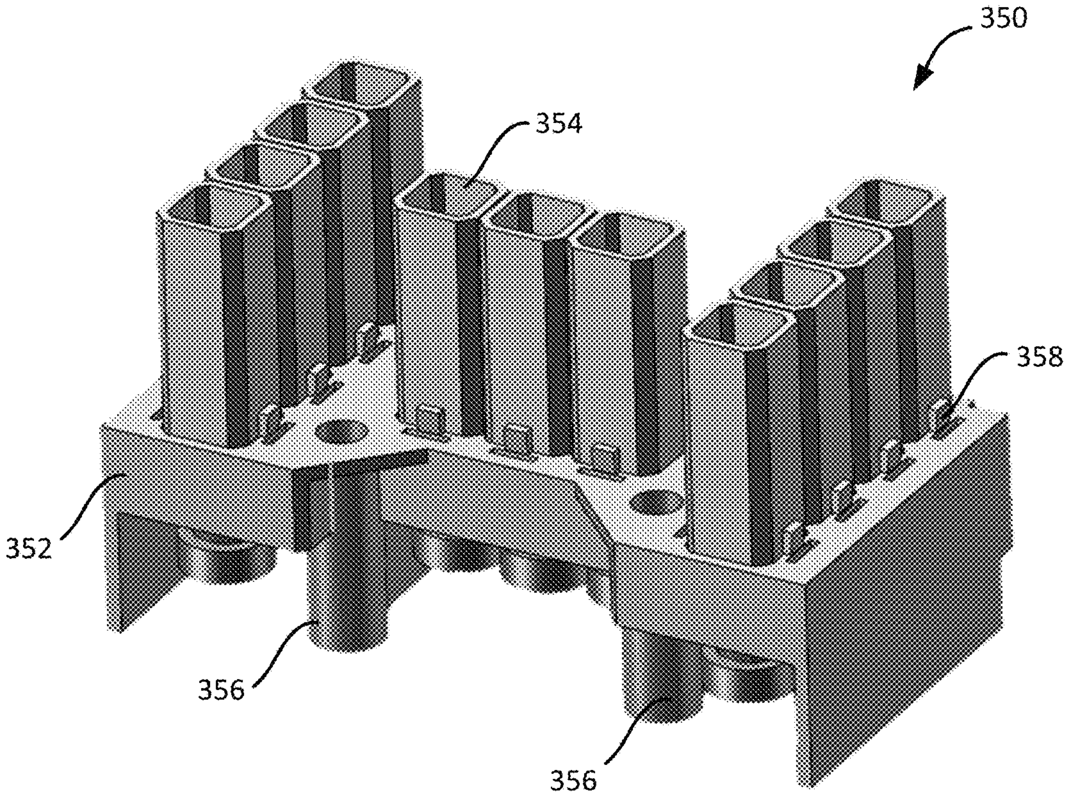
FIGS. 3A-3B illustrate an example of a small-volume reagent region of an integrated reagent cartridge.
Figure 3B:
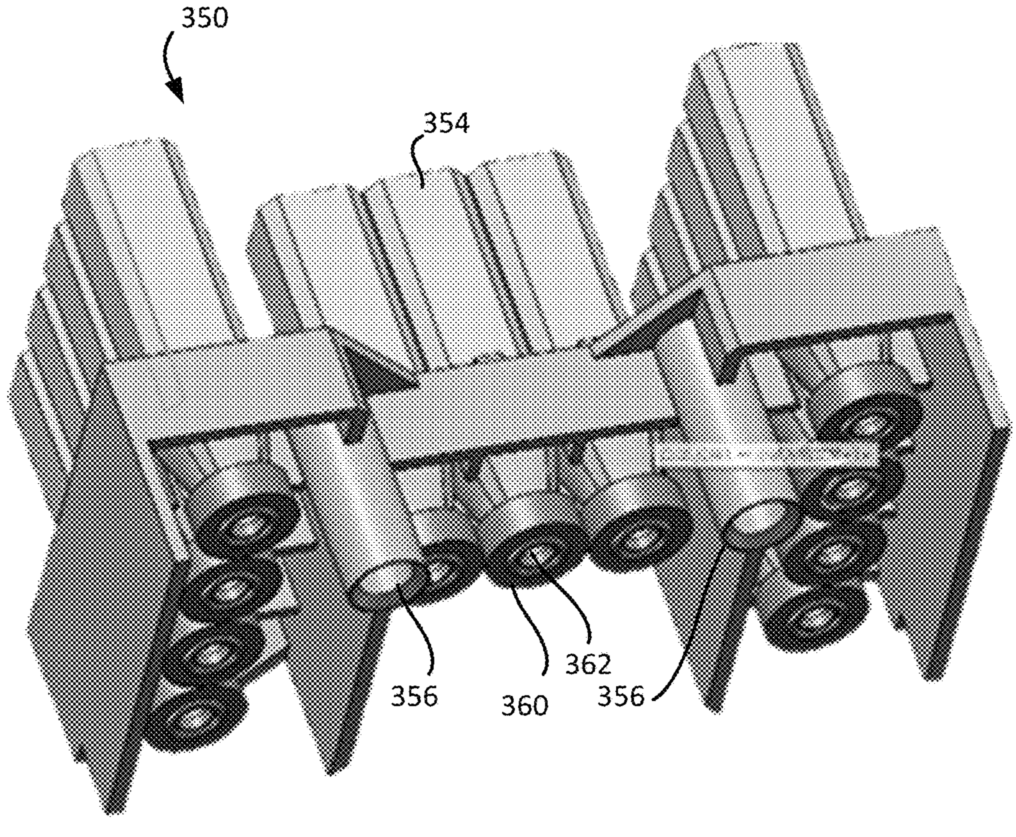

FIGS. 3A-3B shows the small-volume reagent region 350 of the integrated reagent cartridge of FIGS. 1A-B in more detail. The small-volume reagent region 350 can store two to eighteen different sequencing related reagents, with volumes ranging from 0.2 to 2 ml, and a total volume up to 30 ml. Each reagent can be stored in a reagent reservoir 354, ten of which are shown in FIGS. 3A-3B. The reagent reservoirs 354 are housed in a reagent rack 352. Although not shown in FIGS. 3A-3B, in some examples, walls of adjacent reagent reservoirs may be interconnected to each other. In such examples, the small-volume reagent region 350 can include reagent packs of different sizes. For example, the small-volume reagent region 350 shown in FIGS. 3A-3B can include one three-reservoir pack and two four-reservoir packs. Interconnecting the reagent reservoirs 354 can increase stability of the reagent reservoirs 354. Top surfaces and ports of the reagent reservoirs 354 can be sealed with a transparent or opaque seal after the reagent reservoirs 354 are filled. The sealing may include heat sealing with aluminum foil having a thickness between twenty-five and two-hundred-fifty μm. Each reagent reservoir 354 is supported by a pair of frangible supports 358 that are configured to break when the reagent reservoirs 354 are subjected to a downward force that exceeds a breaking threshold of the frangible supports 358. In the example of FIGS. 3A-3B, the frangible supports 358 are frangible support beams supporting the reagent reservoirs 354 on the reagent rack 352. Once the frangible supports 358 are broken, the reagent reservoir 354 can be pushed downward in the reagent rack 352 to create a fluidic connection with a sequencing chip. In examples with interconnected reagent reservoirs, a breaking force required to break the frangible supports 358 may be reduced as the number of frangible supports 358 can be minimized. As shown in FIG. 3B, a gasket ring 360 can encompass a pierceable port 362 on the bottom end of each reagent reservoir 354. The gasket ring 360 can ensure reagents do not leak after the seal has been pierced.

The reagent rack 352 can include alignment holes 356 for aligning the small-volume reagent region 350 with a bottom shell assembly (e.g., bottom shell assembly 170) of the IRC. The alignment holes 356 can receive alignment pillars 477 in FIG. 4B. Proper alignment can allow the reagent reservoirs 354 to line up with ports of the bottom shell assembly 170.

Figure 4A:
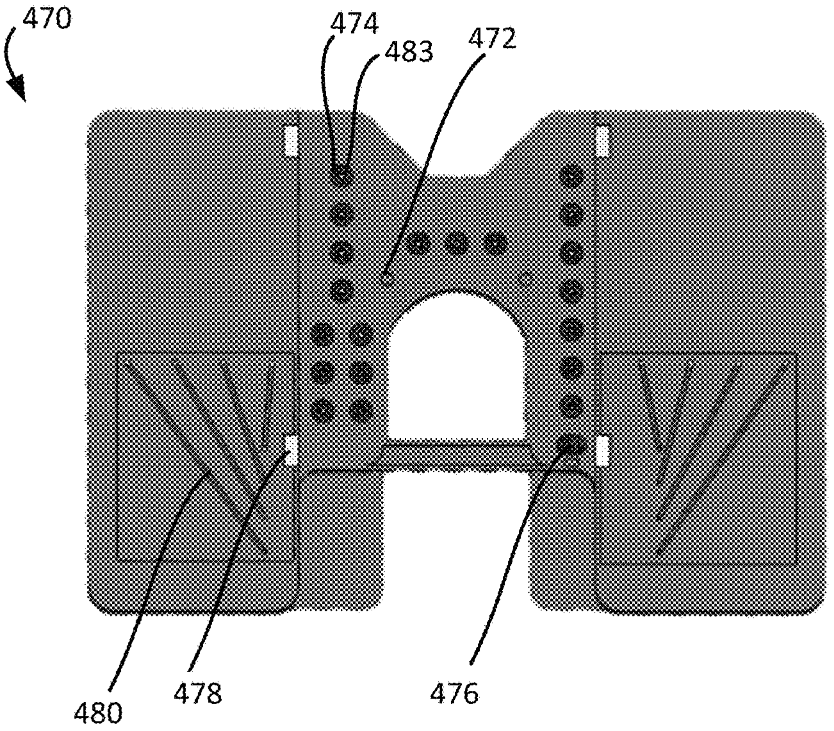
FIGS. 4A-4E illustrate an example of a bottom shell assembly of an integrated reagent cartridge.

FIGS. 4A-4E show the bottom shell assembly 470 of the integrated reagent cartridge of FIG. 1 in more detail. FIG. 4A shows the underside of the bottom shell assembly 470. The underside includes alignment structures for aligning the integrated reagent cartridge on a sequencing chip. For example, alignment holes 472 align the integrated reagent cartridge on a sequencing chip. The underside also includes an arrangement of ports 483 positioned and otherwise configured to align with reagent entry ports on the sequencing chip. The ports 483 can be a combination of single ports and double ports. Each single port of the ports 483 can include a single-port gasket 474 positioned and otherwise configured to seal with reagent entry ports on the sequencing chip. The single-port gaskets 474 may be individually assembled, individually over-molded, or over-molded as one piece to the ports 483. Additionally, each double port of the ports 483 can include a double-port gasket 476 to seal against reagent exit ports on the sequencing chip. The double-port gaskets 476 may be assembled or over-molded to the ports 483. In the example shown in FIG. 4A, the bottom shell assembly 470 includes twenty single ports with single-port gaskets 474, but other examples may include between five and thirty single ports with single-port gaskets 474 depending on the configuration of the sequencing chip the cartridge will be used with and on other factors. The bottom shell assembly 470 can also include openings 478 to connect with resilient connectors on the sequencing chip, facilitating engagement of the integrated reagent cartridge and the sequencing chip.

As also shown in FIG. 4A, the bottom shell assembly 470 may additionally include surface microfluidic channels 480 configured to be fluid channels that allow different reagents to be delivered from the large-volume reagent region to desired ports of the sequencing chip. The surface microfluidic channels 480 may be sealed using lamination, laser welding, ultrasonic welding, pressure sensitive adhesive (PSA) sealing, or another suitable sealing technique. The seal films may have a thickness between 0.1 and 1 mm.

Figure 4B:
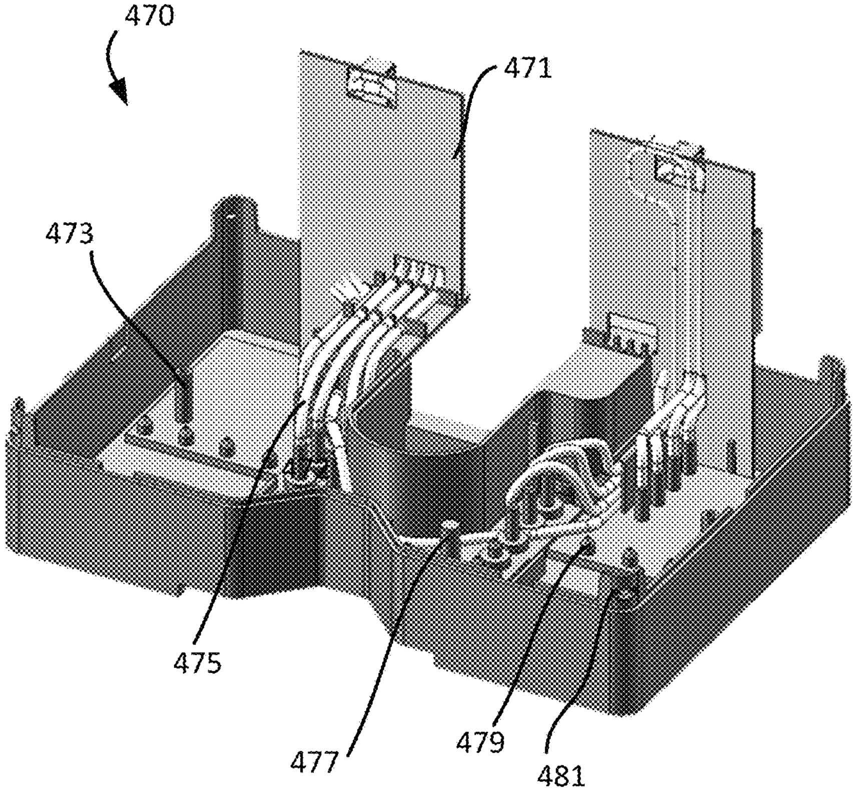

FIG. 4B illustrates an example of a first configuration of the bottom shell assembly 470. The bottom shell assembly 470 includes an arrangement of port piercers 479, each positioned and configured to pierce and fluidically connect to a bottom port of one of the small reagent reservoirs, large reservoirs, or reagent bags. Each port piercer 479 is fluidically connected to one of the ports 483 on the underside of the bottom shell assembly 470 shown in FIG. 4A. Some of the port piercers 479 are directly fluidically connected to the underside ports 483. Others of the port piercers 479 (in this example, the ones that connect to the large reservoirs and reagent bags) fluidically route through the surface microfluidic channels 480 and other fluid channels as described in further detail below. The bottom shell assembly 470 can also include a supporting pillar 473 for the large-volume reagent region and alignment pillars 477 (one of which is not visible in the view of FIG. 4B) for a small-volume reagent region. The bottom shell assembly 470 may also include snap-fit structures 481 for engaging resilient connectors of a top cover and coupling the top cover to the bottom shell assembly 470.

In the first configuration shown in FIG. 4B, the surface microfluidic channels 480 connect to additional fluid channels that are silicone tubes 475. The silicone tubes 475 can be gas permeable, such that sequencing reagents that require oxygen can receive oxygen before the reagents flow into the sequencing chip. The silicone tubes 475 can be positioned on silicone tube racks 471 that hold the silicone tubes 475 in place.

Figure 4D:
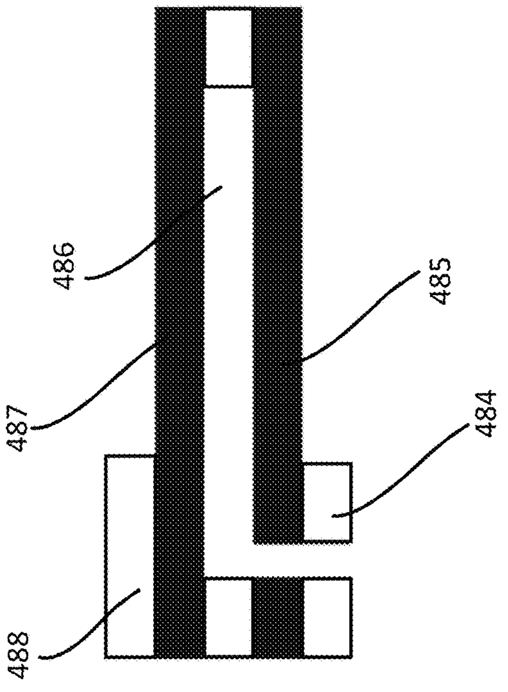
Figure 4C:
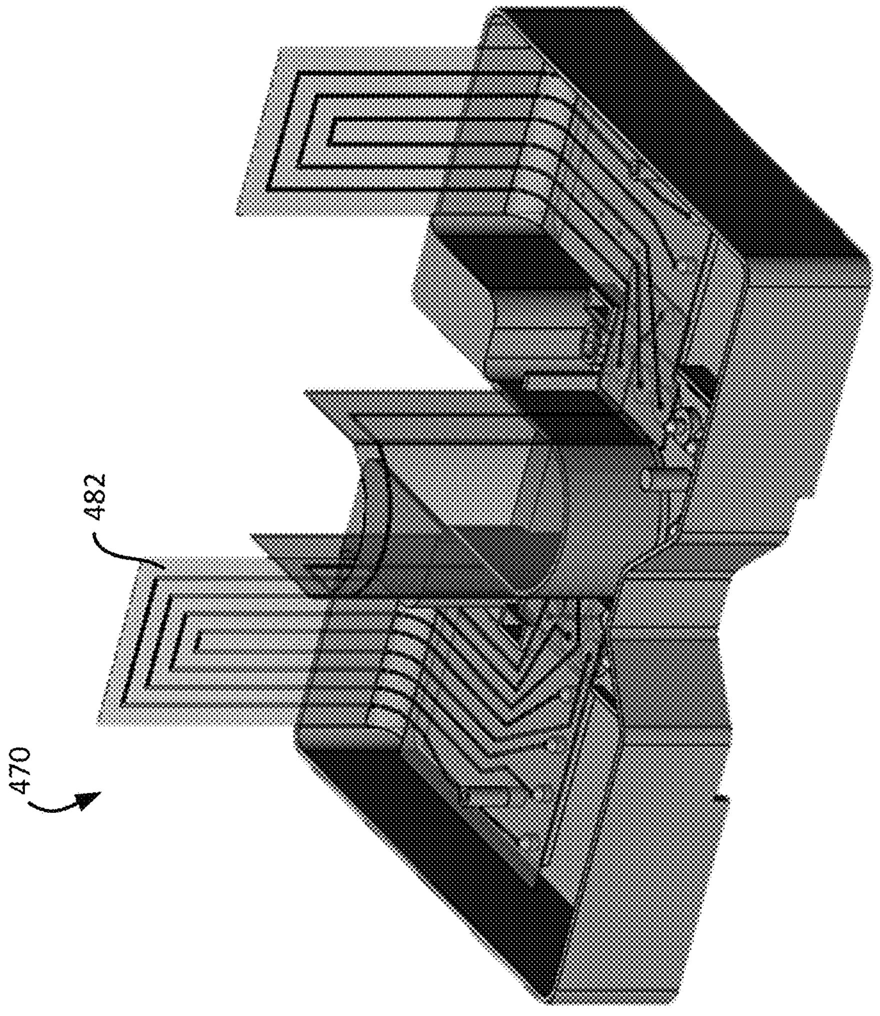

FIGS. 4C-4D illustrate an example of a second configuration of the bottom shell assembly 470. In the second configuration, fluids from the large-volume reagent region (e.g., large-volume reagent region 230) are flowed through membrane channels 482 in the reagent cartridge prior to passing through ports 483 on the underside of the reagent cartridge to entry ports on the sequencing chip. The membrane channels 482 can be gas-permeable to allow oxygen intake before the reagents flow into the sequencing chip. The membrane channels 482 can be flexible and include multiple layers, as illustrated in FIG. 4D. Each layer of the membrane channels 482 can include up to five material layers, such as a first layer 484, a second layer 485, a third layer 486, a fourth layer 487, and a fifth layer 488. The first layer 484 can be an adhesive layer with a reagent port for coupling to a reagent port on the bottom shell assembly 470. The second layer 485 can be a thin film, gas-permeable layer that acts as the bottom of the channel. The third layer 486 can be one or more adhesive layers with a channel cut into it. The fourth layer 487 can be a thin film, gas-permeable layer that acts as the top of the channel. The fifth layer 488 can be an adhesive layer for coupling to another layer of the membrane channels 482. The second layer 485 and the fourth layer 487 may be tuned for a desired oxygenation level. Thus, the second configuration allows for control over the performance of each layer.

Figure 4E:
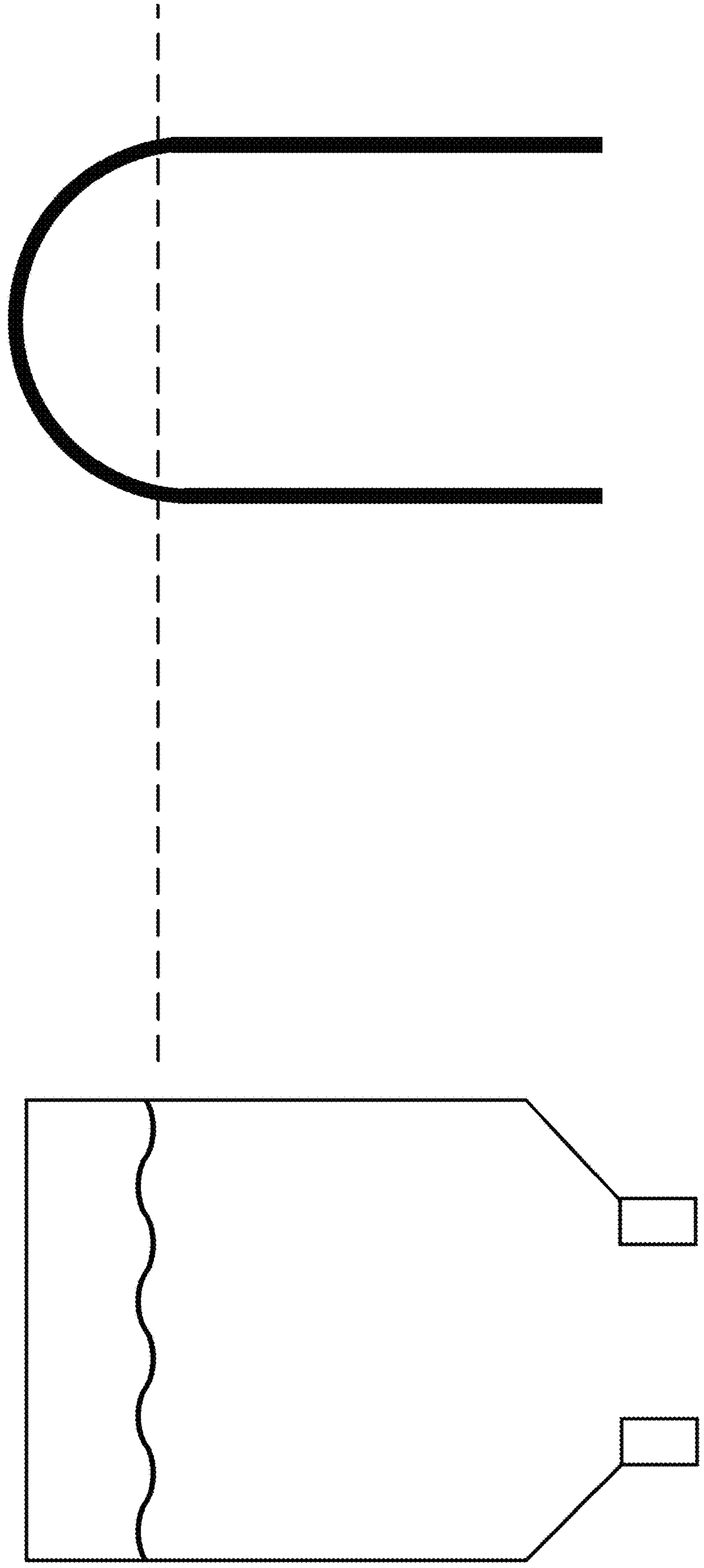

In both the first configuration and second configuration, the tubes and membrane channels are routed so that an upper loop of the channels is higher than a maximum fluid surface level of reagents in the large-volume reagent reservoirs when the integrated reagent cartridge is in an upright orientation. This is schematically illustrated in FIG. 4E. Prior to disengagement, the system may pump a small volume of air into the silicone tubes 475 or the membrane channels 482 so that air bubbles are trapped at the upper parts of the tubes or channels. When the reagent cartridge is disengaged from the sequencing chip, these trapped air bubbles will make it more difficult for reagents to flow past the upper parts of the channels, preventing undesired leaking for fluids from the reagent cartridge after use.

Figure 5A:
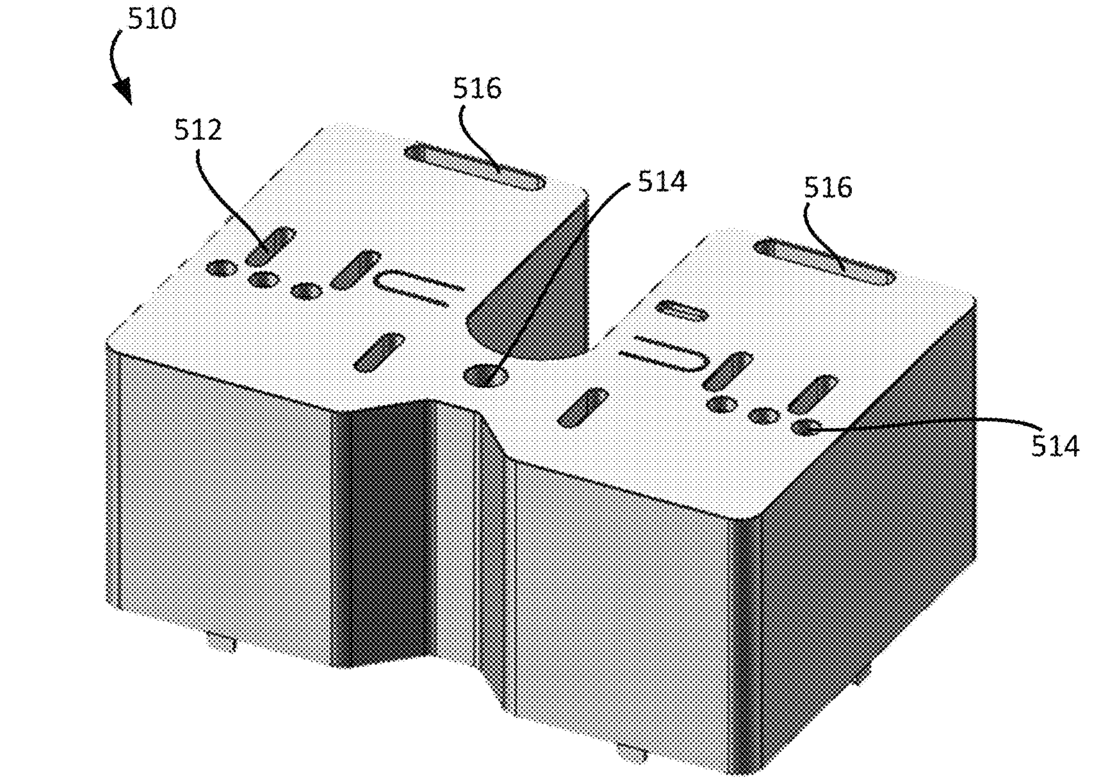
FIGS. 5A-5B illustrate an example of a top cover of an integrated reagent cartridge.
Figure 5B:
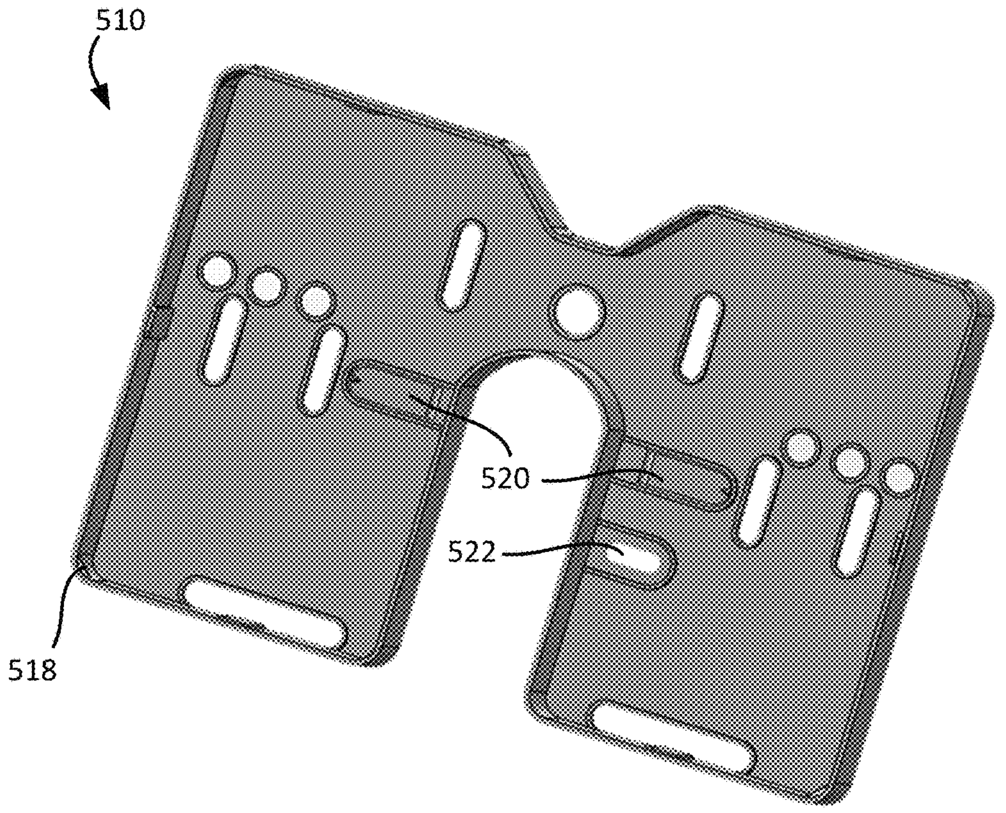

FIGS. 5A-5B illustrate an example of a top cover 510 of an integrated reagent cartridge. In the particular example shown in FIGS. 5A-5B, the top cover 510 includes four access openings 512, six reagent ports 514, two air ports 516, four resilient connectors 518, two cantilever piercers 520, and a manifold slot 522. In other configurations, other numbers and arrangements of these features may be used.

The cantilever piercers 520 can be displaced inwardly by actuators of an instrument (e.g. two of the actuator arms 704 shown in FIG. 7) to pierce the top seals of the first large reservoir 232 and the second large reservoir 234 for venting. The cantilever piercers 520 can include a frangible portion to prevent them from unintentionally being displaced inwardly prior to installation in the instrument.

The access openings 512 allow other actuator arms of the instrument to penetrate inside the integrated reagent cartridge and press downwardly on parts of the large-volume reagent region 230, which, as discussed in further detail below, results in piercing of other seals and fluidic connection of the reagent storage containers to the pierceable ports in the bottom shell assembly 470.

The manifold slot 522 can connect an external pump of the sequencing system to reagent exit ports on the sequencing chip.

The reagent ports 514 can receive reagents pipetted by a user into the IRC, allowing for customized reagent modification and/or addition. The reagents can be pipette through the reagent ports 514 into the second type of reagent bag 244 or the reagent reservoirs 354.

The air ports 516 can provide a path for the sequencing system to supply air inside the IRC. For example, air with constant temperature can be fed to the IRC through the air ports 516, which allows for a suitable temperature environment (e.g., 10-25° C.) for an on-board reagent when the IRC is operated in the sequencing system.

The resilient connectors 518 can engage with additional snap-fit structures (e.g., snap-fit structures 481) of a bottom shell assembly to create a secure connection between the two components.

Figure 6B:
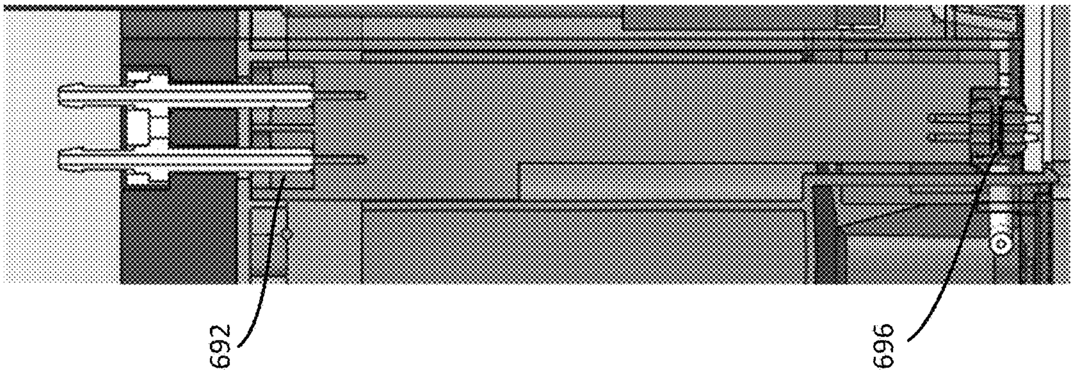
FIGS. 6A-6B illustrate an example of a manifold assembly of an integrated reagent cartridge.
Figure 6A:
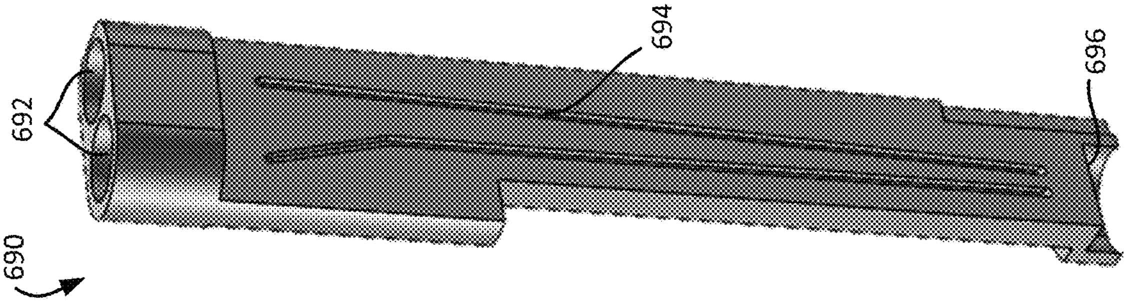

FIG. 6A illustrates an example of a manifold assembly 690 of an integrated reagent cartridge. As shown, the manifold assembly 690 includes pump connections 692, microfluidic channels 694, and port connection 696. FIG. 6B illustrates an example of the manifold assembly 690 connected to the sequencing chip and a base unit of the sequencing system. In FIG. 6B, the pump connections 692 can connect with and seal against an external pump of the sequencing system, and the port connections 696 can connect with and seal against reagent exit ports of the sequencing chip. The manifold assembly 690 provides a connection between the sequencing chip and the external pump of the sequencing system. A cross-section of the microfluidic channels 694 can range from 0.1 to 1 mm in width or height.

Figure 7:
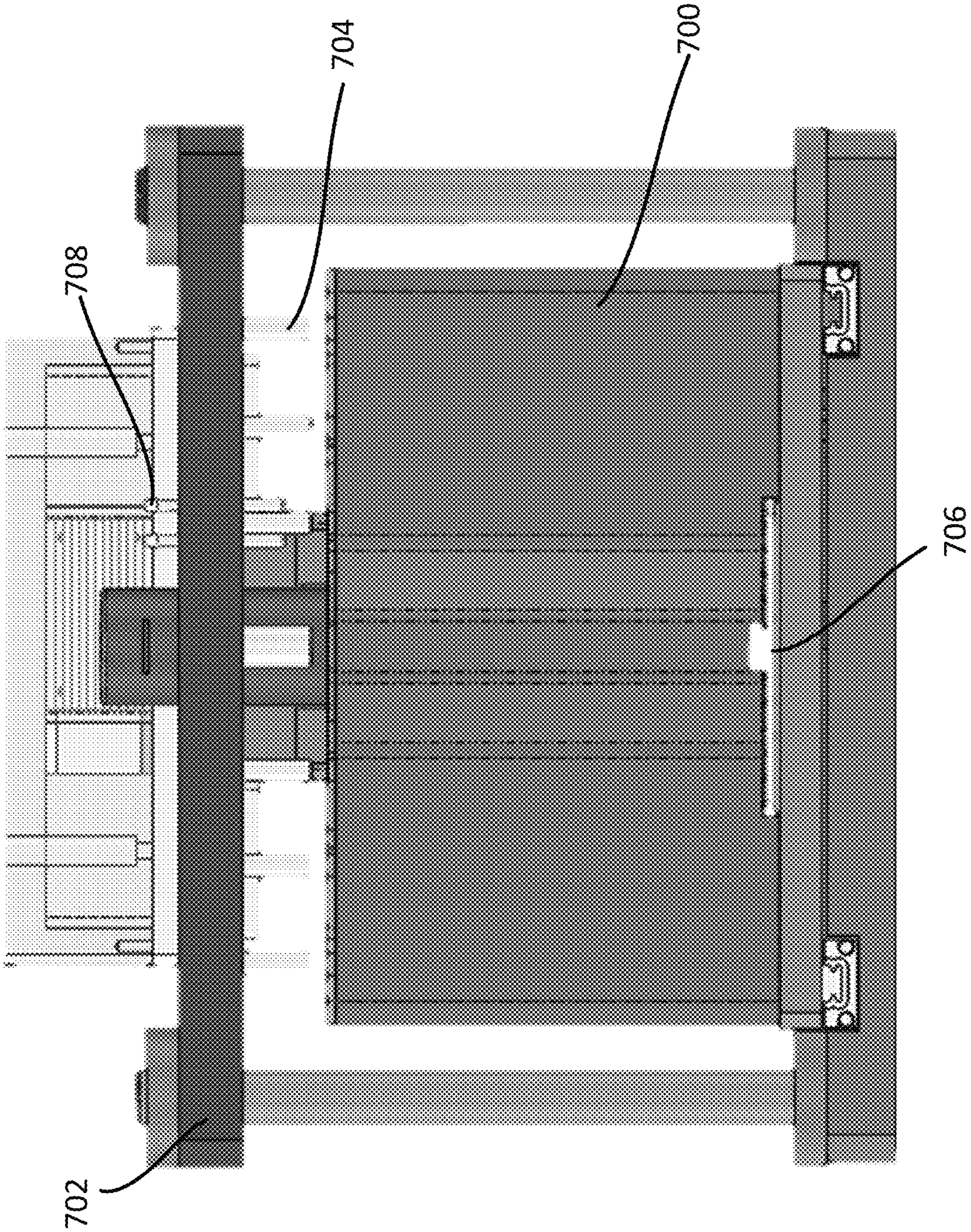
FIG. 7 illustrates an example of an integrated reagent cartridge installed in a sequencing system.
Figure 8A:
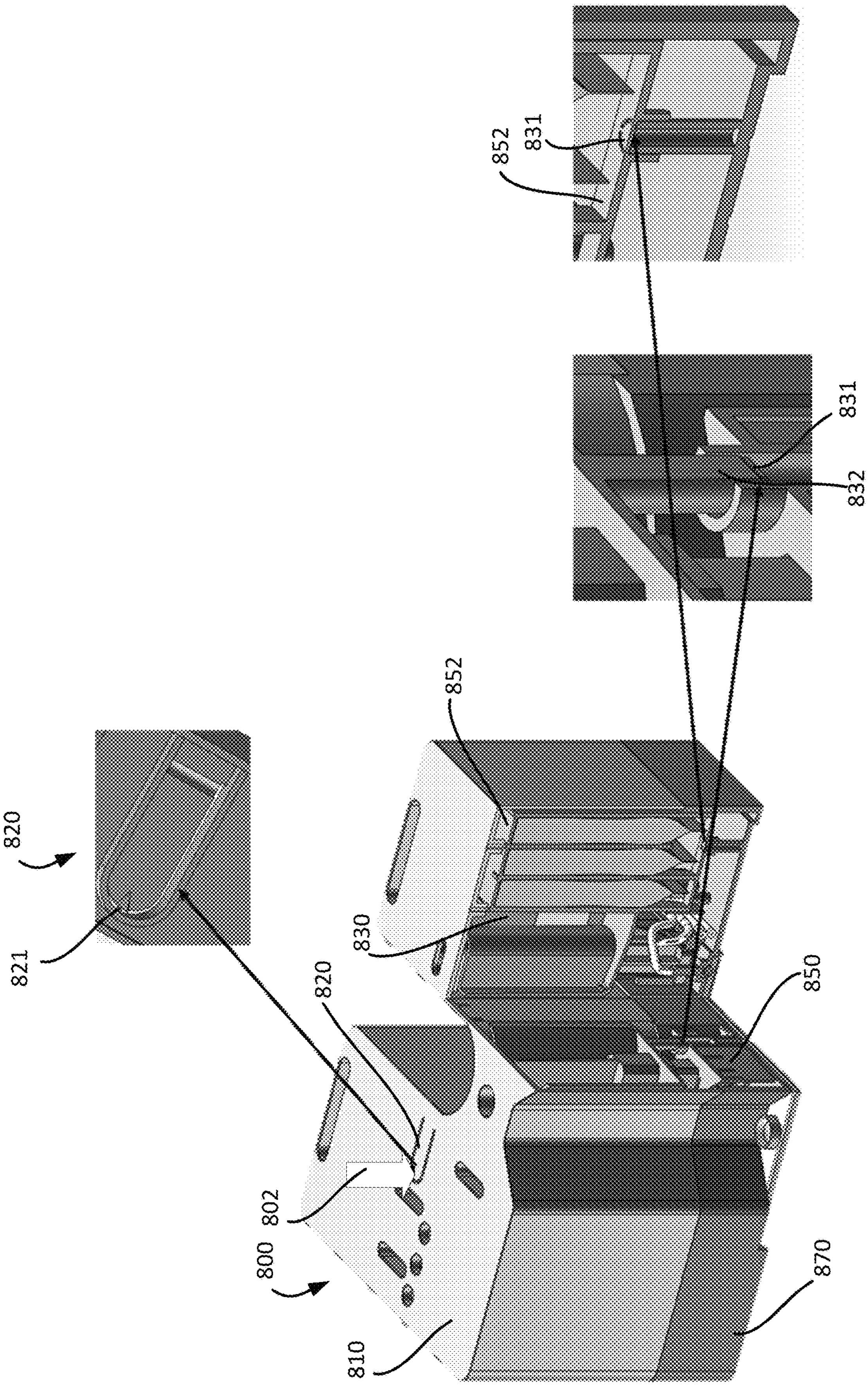
FIGS. 8A-8C illustrate an example of a process of engaging the integrated reagent cartridge during sequencing.
Figure 8B:
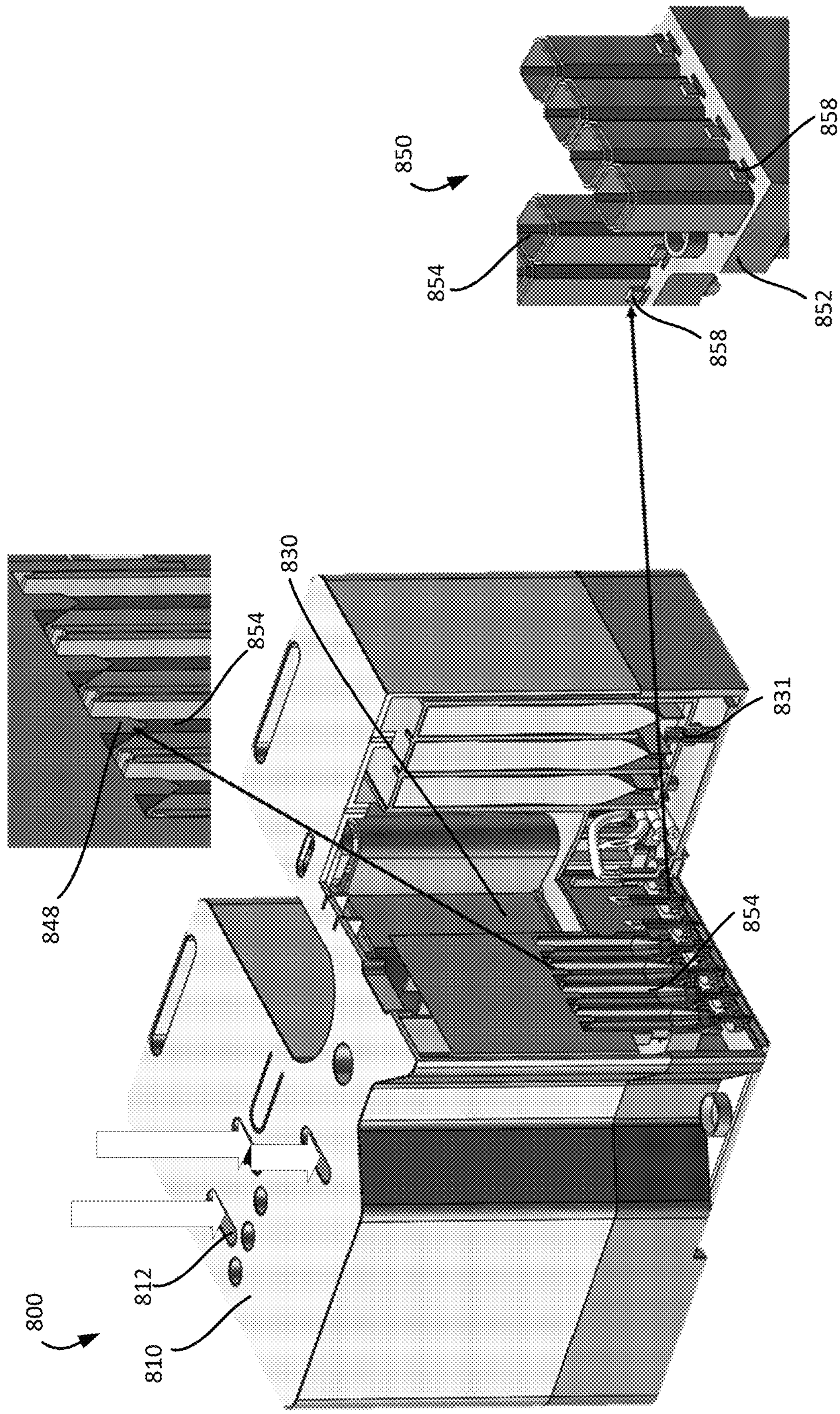
Figure 8C:
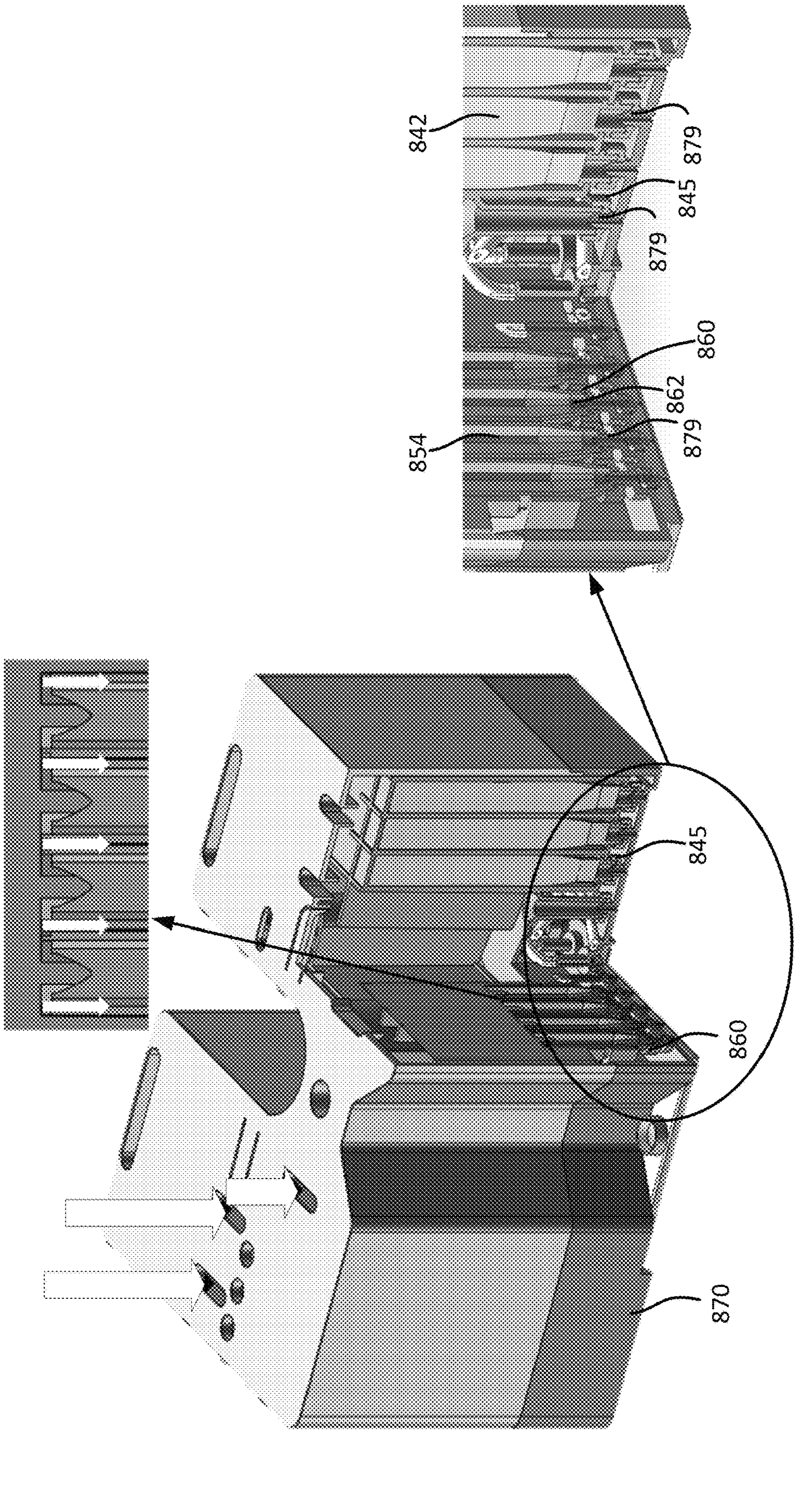
Figure 9:
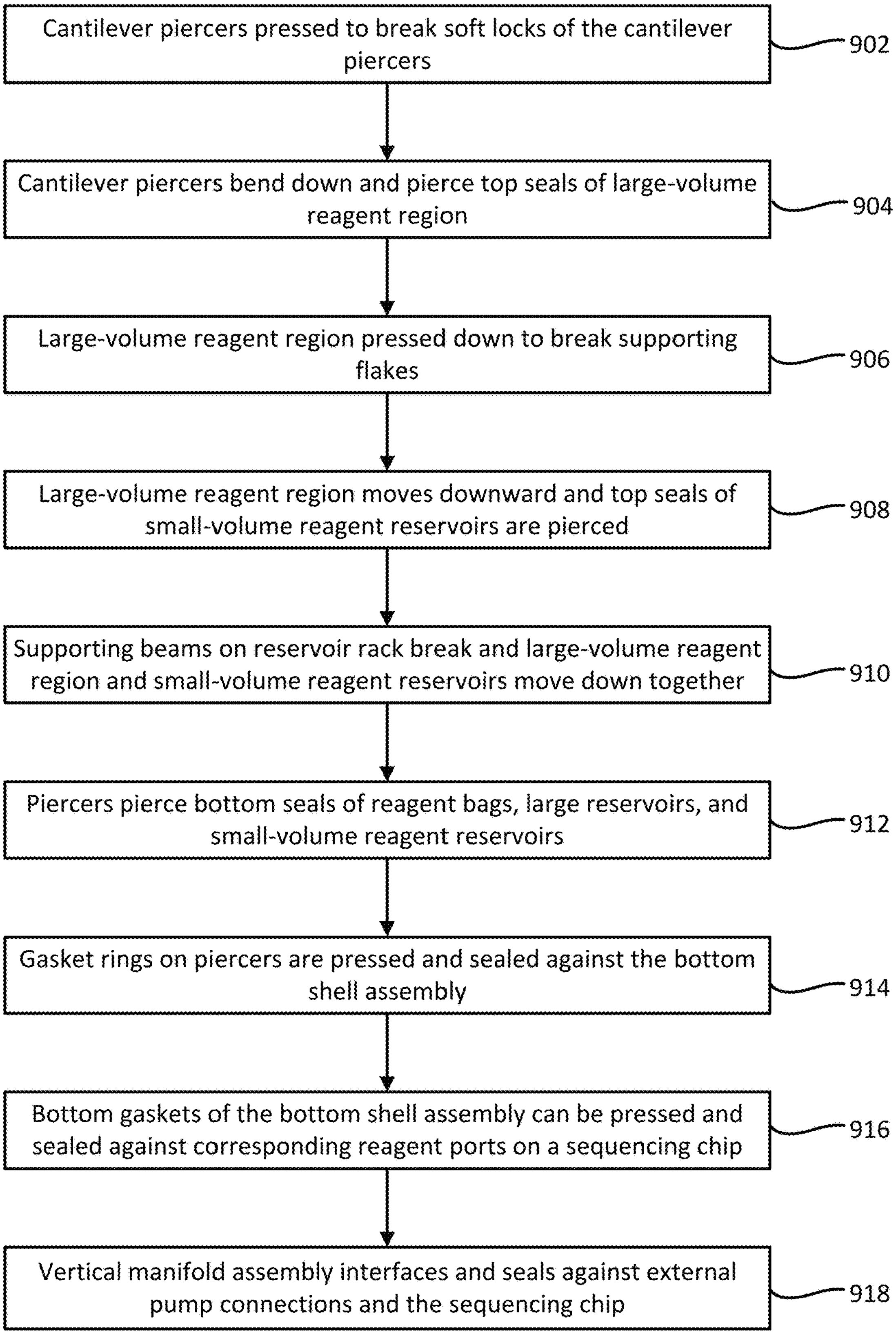
FIG. 9 is a flowchart of a process of engaging the integrated reagent cartridge during sequencing.

FIG. 7 illustrates an example of an integrated reagent cartridge 700 installed in a sequencing system on a microfluidic chip. As shown in FIG. 7, the integrated reagent cartridge 700 is installed relative to a compressing instrument 702 of the base unit, and on top of the sequencing chip 706. As discussed in further detail below, actuation of the compressing unit will cause piercing of various seals in the integrated reagent cartridge and will also result in several fluidic connections between various components of the integrated reagent cartridge and between the integrated reagent cartridge and other components of the sequencing system FIGS. 8A-8C illustrate an example of installing and connecting an integrated reagent cartridge 800 to a sequencing system. FIGS. 8A-8C are described with respect to steps of FIG. 9. In FIG. 8A, a compressing instrument 802, similar to the compressing instrument 702 in FIG. 7, of the sequencing system can press down one or more cantilever piercers 820 of a top cover 810 to break a soft lock 821 of the cantilever piercers 820 (step 902). The cantilever piercers 820 can then bend down and pierce top seals of a large-volume reagent region 830 (step 904). During this step, frangible supports 831 on the large-volume reagent region 830 and on a reagent rack 852 of a small-volume reagent region 850 prevent the large-volume reagent region 830 from moving down during the piercing process. The frangible supports 831 can support a framework 832 of the large-volume reagent region 830 that holds the large reservoirs. The frangible supports 831 may additionally support the reagent rack 852 that holds the small-volume reagent reservoirs 854. Thus, a force needed to break the soft lock 821 is smaller than a force needed to break the frangible supports 831.

In the step shown in FIG. 8B, pressing rods of the compressing instrument can pass through the access ports 812 on the top cover 810 and press down on the large-volume reagent region 830, as illustrated by the arrows (step 906). In this step, the pressing rods press with sufficient force to break the frangible supports 831, resulting in the large-volume reagent region 830 moving downwardly inside of the integrated reagent cartridge. As the large-volume reagent region 830 moves downwardly, venting piercers 848 on the underside of the large-volume reagent rack will pierce top seals of the small-volume reagent reservoirs 854 of the small-volume reagent region 850 (step 908). During this step, supporting beams 858 on the reagent rack 852 prevent the small-volume reagent reservoirs 854 from moving down during the piercing process.

In the step shown in FIG. 8C, the pressing rods of the compressing instrument can further press down on the large-volume reagent region 830, which in turn presses down on the top of the small-volume reagent reservoirs 854. During this step, sufficient force is applied such that the supporting beams 858 on the reagent rack 852 of the small-volume reagent region 850 can break away. This allows for the large-volume reagent region 830 and the small-volume reagent reservoirs 854 of the small-volume reagent region 850 to move down together inside of the integrated reagent cartridge (step 910). As the large-volume reagent region 830 and the small-volume reagent reservoirs 854 move downwardly, port piercers 879 on the bottom shell assembly 870 will pierce bottom seals of the pierceable ports of the reagent bags 842, the large reservoirs (not shown in this figure), and the small-volume reagent reservoirs 854 (step 912), with gasket rings 845/860 facilitating sealing of those fluidic connections (step 914). At the same time, bottom gaskets (not shown in this figure) of the bottom shell assembly 870 are pressed and sealed against corresponding reagent ports on the sequencing chip (step 916). While pressing down, the resilient connectors 246 will extend through the openings 478 on the bottom of the shell to engage the sequencing chip, and external pump connections of the instrument and reagent exit ports of the sequencing chip can interface and seal against the ports of the manifold assembly (not shown) (step 918).

In some embodiments, various components of the different embodiments described herein may be manufactured using injection-molding processes. Such processes may result in low-cost parts, and may make it cost-effective for the reagent cartridge is to be used as disposable consumables.

It is understood that the examples and embodiments described herein are for illustrative purposes only and that various modifications or changes in light thereof will be suggested to persons skilled in the art and are to be included within the spirit and purview of this application and scope of the appended claims. [0073] It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

While the foregoing disclosure shows illustrative aspects of the disclosure, it should be noted that various changes and modifications could be made herein without departing from the scope of the disclosure as defined by the appended claims. Furthermore, although elements of the disclosure may be described or claimed in the singular, the plural is contemplated unless limitation to the singular is explicitly stated.

What is claimed is:

1. An integrated reagent cartridge, comprising:

(a) an integrated reagent cartridge shell and a plurality of fluidic device ports, each fluidic device port comprising a discrete opening in a wall of the shell extending to an exterior of the shell, the fluidic device ports configured to connect to a fluidic device;

(b) a plurality of reagent storage containers inside the shell, at least some of the reagent storage containers each containing a fluid reagent;

(c) wherein at least some of the reagent storage containers are positioned inside the shell in a movable fashion such that those reagent storage containers can be moved inside the shell from positions in which those containers are not fluidically connected to the plurality of fluidic device ports to positions in which those containers are fluidically connected to the plurality of fluidic device ports; and (d) further comprising a manifold extending through the integrated reagent cartridge, the manifold comprising at least one microfluidic channel, wherein the manifold further comprises at least one port at a first end of the microfluidic channel configured to fluidically connect to a pump port of an instrument, and at least one port at a second end of the microfluidic channel configured to connect to an exit port of the fluidic device.

2. The integrated reagent cartridge of claim 1, wherein some of the reagent storage containers comprise reagent reservoirs, wherein the reagent reservoirs each comprise a seal and at least one reservoir port.

3. The integrated reagent cartridge of claim 2, wherein the integrated reagent cartridge is configured for the reagent reservoirs to be vented and fluidically connected to the fluidic device ports such that in a first position the reagent reservoirs are each sealed and in a second position the reagent reservoirs are each vented and connected by at least one of the reservoir ports to one of the fluidic device ports.

4. The integrated reagent cartridge of claim 2, wherein some of the reagent storage containers comprise flexible reagent storage containers, wherein the flexible reagent storage containers each comprise at least one port.

5. The integrated reagent cartridge of claim 4, wherein the at least one port of each of the flexible reagent storage containers include at least one filling port configured to receive the fluid reagent and at least one dispensing port configured to be connected to one of the fluidic device ports.

6. The integrated reagent cartridge of claim 5, wherein the integrated reagent cartridge is configured for the flexible reagent storage containers to be fluidically connected to the fluidic device ports such that in a first position the flexible reagent storage containers are each disconnected from the fluidic device ports and in a second position the flexible reagent storage containers are each connected by at least one of the dispensing ports to one of the fluidic device ports.

7. The integrated reagent cartridge of claim 5, wherein the filling port of some of the flexible reagent storage containers comprises a self-sealing plug, wherein the filling port of other of the flexible reagent storage containers comprises an open filling port for user input of the fluid reagent.

8. The integrated reagent cartridge of claim 7, wherein the shell comprises at least one opening aligned with at least one of the open filling ports.

9. The integrated reagent cartridge of claim 1, the integrated reagent cartridge further comprising frangible supports configured to resist movement of the reagent storage containers inside of the shell.

10. The integrated reagent cartridge of claim 1, the integrated reagent cartridge further comprising a plurality of port piercers, each port piercer fluidically connected to one of the fluidic device ports, the port piercers configured to pierce sealed ports of the reagent storage containers when the reagent storage containers are moved to the positions in which those containers are fluidically connected to the plurality of fluidic device ports.

11. The integrated reagent cartridge of claim 1, the integrated reagent cartridge further comprising a plurality of venting piercers, each venting piercer configured to be moved to vent one or more of the reagent storage containers.

12. The integrated reagent cartridge of claim 11, wherein some of the venting piercers comprise movable portions of the shell.

13. The integrated reagent cartridge of claim 11, wherein some of the venting piercers comprise movable structures inside of the shell.

14. The integrated reagent cartridge of claim 1, the integrated reagent cartridge further comprising a plurality of alignment structures configured to align the integrated reagent cartridge relative to the fluidic device.

15. The integrated reagent cartridge of claim 1, the integrated reagent cartridge further comprising a plurality of fluid channels, each configured for fluidic connection between one of the reagent storage containers and one of the fluidic device ports.

16. The integrated reagent cartridge of claim 15, wherein the fluid channels comprise gas permeable fluid channels.

17. The integrated reagent cartridge of claim 15, wherein the fluid channels are configured to resist reagent leaking when the integrated reagent cartridge is disconnected from the fluidic device.

18. The integrated reagent cartridge of claim 17, wherein the fluid channels each comprise a top position that, when the integrated reagent cartridge is in an upright orientation, is higher than a maximum fluid surface level of the reagent storage container to which the fluid channel is fluidically connected.

19. The integrated reagent cartridge of claim 1, wherein the shell comprises at least one cooling air inlet and outlet.

20. An integrated reagent cartridge, comprising:

(a) a plurality of reagent storage containers, some of the reagent storage containers comprising reagent reservoirs, wherein at least some of the reagent reservoirs each comprise a ventable seal and at least one reservoir port;

(b) a plurality of fluidic device ports configured to fluidically connect the reagent reservoirs to a fluidic device;

(c) movable venting piercers configured to pierce the ventable seals; and (d) a plurality of frangible supports, the plurality of frangible supports configured to support the reagent reservoirs in a first position while the ventable seals of the reagent reservoirs are pierced by the venting piercers, the plurality of frangible supports configured to prevent movement of the reagent reservoirs from the first position while the ventable seals of the reagent reservoirs are pierced by the venting piercers, the plurality of frangible supports configured to break to allow the reagent reservoirs to move to a second position away from the first position and towards the fluidic device ports in which the reagent reservoirs are fluidically connected to the fluidic device ports.

21. The integrated reagent cartridge of claim 20, the integrated reagent cartridge further comprising piercing ports fluidically connected to the fluidic device ports, the piercing ports configured to pierce and fluidically connect to the reservoir ports when the reagent reservoirs move to the second position.

* * * * *